(12) United States Patent
Galvan et al.

(10) Patent No.: US 11,999,839 B2
(45) Date of Patent: Jun. 4, 2024

(54) POLYETHYLENE COMPOSITION FOR FILAMENTS OR FIBERS

(71) Applicant: BASELL POLYOLEFINE GMBH, Wesseling (DE)

(72) Inventors: Monica Galvan, Ferrara (IT); Gianni Perdomi, Ferrara (IT)

(73) Assignee: Basell Polyolefine GmbH, Wesseling (DE)

(*) Notice: Subject to any disclaimer, the term of this patent is extended or adjusted under 35 U.S.C. 154(b) by 223 days.

(21) Appl. No.: 17/779,686

(22) PCT Filed: Dec. 2, 2020

(86) PCT No.: PCT/EP2020/084307
§ 371 (c)(1),
(2) Date: May 25, 2022

(87) PCT Pub. No.: WO2021/110762
PCT Pub. Date: Jun. 10, 2021

(65) Prior Publication Data
US 2023/0002598 A1 Jan. 5, 2023

(30) Foreign Application Priority Data
Dec. 3, 2019 (EP) .................... 19213060

(51) Int. Cl.
*C08L 23/08* (2006.01)
*D01F 6/04* (2006.01)

(52) U.S. Cl.
CPC ............ *C08L 23/0815* (2013.01); *D01F 6/04* (2013.01); *C08L 2201/08* (2013.01); *C08L 2203/12* (2013.01); *C08L 2205/025* (2013.01); *C08L 2205/035* (2013.01); *D10B 2321/021* (2013.01); *D10B 2505/202* (2013.01)

(58) Field of Classification Search
CPC .... C08F 210/08; C08F 210/06; C08F 210/02; C08F 2500/12; C08F 2500/17; C08F 2500/27; C08L 23/06; C08L 23/12; C08L 2203/16; C08L 23/0815
See application file for complete search history.

(56) References Cited

U.S. PATENT DOCUMENTS 4,399,054 A    8/1983  Ferraris et al.
2012/0171393 A1* 7/2012  de Palo ............... E01C 13/08
                                                428/17

FOREIGN PATENT DOCUMENTS

| CN | 1606595 A | 4/2005 | |
| EP | 0045977 A2 | 2/1982 | |
| EP | 0129368 A1 | 12/1984 | |
| EP | 0361493 A1 | 4/1990 | |
| EP | 0416815 A2 | 3/1991 | |
| EP | 0545304 A1 | 6/1993 | |
| EP | 0561479 A1 | 9/1993 | |
| EP | 0576970 A1 | 1/1994 | |
| EP | 592852 A1 * | 4/1994 | ............ C08L 23/04 |
| EP | 0632063 A1 | 1/1995 | |
| EP | 0659758 A1 | 6/1995 | |
| EP | 0661300 A1 | 7/1995 | |
| WO | 9409193 A1 | 4/1994 | |
| WO | 0031090 A1 | 6/2000 | |
| WO | 2005005730 A1 | 1/2005 | |
| WO | WO-2007071494 A1 * | 6/2007 | ......... B29B 17/0042 |
| WO | 2009101124 A1 | 8/2009 | |
| WO | 2009103516 A2 | 8/2009 | |
| WO | WO-2009101124 A1 * | 8/2009 | ............ C08F 210/16 |
| WO | 2011032917 A1 | 3/2011 | |
| WO | 2011134897 A2 | 11/2011 | |
| WO | WO-2017202600 * | 11/2017 | .......... C08L 23/0815 |
| WO | 2019007684 A1 | 1/2019 | |

OTHER PUBLICATIONS

Pang and Rudin, Size-Exclusion Chromatographic Assessment of Long-Chain Branch Frequency in Polyethylenes, Chapter 17, pp. 254-269, ACS Symposium Series; American Chemical Society, Washington, DC, 1993.
Huggins, M.L., The Viscosity of Dilute Solutions of Long-Chain Molecules, IV Dependence on Concentration, Journal of the American Chemical Society, Nov. 1, 1942, vol. 64, p. 2716.
Grubisic, Rempp, and Benoit, A Universal Calibration for Gel Permeation Chromatography, Journal of Polymer Science Part B: Polymer Letters, 1967, vol. 5, pp. 753-759, DOI: 10.1002/POL 1967.110050903.
International Search Report and Written Opinion dated Mar. 9, 2021 (Mar. 9, 2021) For Corresponding PCT/US2020/084307.

* cited by examiner

*Primary Examiner* — Mark S Kaucher

(57) ABSTRACT

A polyethylene composition for preparing filaments and fibers, made from or containing:

A) from 65% to 97% by weight of a copolymer of ethylene having:
  1) a density of 0.925 g/cm³ or higher; and
  2) a $MI_2$ value of 0.5 g/10 min. or greater; and B) from 3% to 35% by weight of a polyolefin composition made from or containing:
  $B^I$) from 5% to 35% by weight of a propylene homopolymer;
  $B^{II}$) from 20% to 50% by weight of an ethylene homopolymer or a copolymer of ethylene with up to 5% by weight of alpha-olefin comonomers, containing 5% by weight or less of a fraction soluble in xylene at 25° C.; and
  $B^{III}$) from 30% to 60% by weight of a terpolymer of ethylene, propylene, and 1-butene containing from 30% to 85% by weight of a fraction soluble in xylene at 25° C.

15 Claims, No Drawings

POLYETHYLENE COMPOSITION FOR FILAMENTS OR FIBERS

This application is the U.S. National Phase of PCT International Application PCT/EP2020/084307, filed Dec. 2, 2020, claiming benefit of priority to European Patent Application No. 19213060.7, filed Dec. 3, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polyethylene composition for filaments or fibers.

BACKGROUND OF THE INVENTION

As used herein, the term "filaments" refers to fibers for textile and carpeting applications. As used herein, the term "artificial turf filaments" refers to filaments have a titer of at least 20 denier (hereinafter called "den") and used to prepare artificial turf structures.

In some instances and to produce the final artificial turf structure, the filaments are fixed to a backing substrate.

In some instances, softness and UV resistance of artificial turf filaments are achieved by using polyethylene materials as a polyolefin component of the filament or fiber.

In some instances, the polyethylene materials are produced by using metallocene catalysts in polymerization.

In some instances, polymer filaments or fibers are made from or containing ethylene polymers having:
a) a density of 0.900 g/cm$^3$ or higher;
b) a MI$_{21}$ value of 25 g/10 min. or greater; and
c) a MFR value from 25 to 60.

In some instances, the ethylene polymers are mixed with an elastomeric or plastomeric polyolefin or polyolefin composition.

SUMMARY OF THE INVENTION

In a general embodiment, the present disclosure provides a polyethylene composition, hereinafter called "polyethylene composition (I)", made from or containing:
A) from 65% to 97% by weight of a copolymer of ethylene with one or more comonomers selected from C$_3$-C$_{10}$ alpha-olefins, wherein the ethylene copolymer has:
  1) a density of 0.925 g/cm$^3$ or higher, measured according to ISO 1183-1:2012 at 23° C.; and
  2) a MI$_2$ value of 0.5 g/10 min. or greater, where MI$_2$ is the Melt Index measured according to ISO 1133-2:2011 at 190° C. with a load of 2.16 kg; and
B) from 3% to 35% by weight of a polyolefin composition made from or containing:
  B$^I$) from 5% to 35% by weight of a propylene homopolymer containing 10.0% by weight or less of a fraction soluble in xylene at 25° C. (XS$^I$), referred to the weight of B$^I$);
  B$^{II}$) from 20% to 50% by weight of an ethylene homopolymer or a copolymer ethylene with up to 5% by weight of one or more comonomers selected from C$_3$-C$_{10}$ alpha-olefins, both homopolymer and copolymer containing 5% by weight or less of a fraction soluble in xylene at 25° C. (XS$^{II}$), both the amount of comonomers and the amount of the fraction XS$^{II}$ being referred to the weight of B$^{II}$); and
  B$^{III}$) from 30% to 60% by weight of a terpolymer of ethylene, propylene, and butene-1 containing from 45% to 65% by weight of ethylene units, and from 15% to 38% by weight of 1-butene units, and containing from 30% to 85% by weight of a fraction soluble in xylene at 25° C. (XS$^{III}$), the amounts of ethylene units and butene-1 units and of the fraction XS$^{III}$ being referred to the weight of B$^{III}$);

the amounts of A) and B) being referred to the total weight of A)+B) and the amounts of B$^I$), B$^{II}$) and B$^{III}$) being referred to the total weight of B$^I$)+B$^{II}$)+B$^{III}$).

In some embodiments, component A) is from 65% to 97% by weight, alternatively from 70% to 95% by weight, alternatively from 75% to 95% by weight, of a copolymer of ethylene with one or more comonomers selected from C$_3$-C$_{10}$ alpha-olefins. In some embodiments, the ethylene copolymer has a density of 0.925 g/cm$^3$ or higher, alternatively 0.930 g/cm$^3$ or higher, alternatively from 0.925 to 0.945 g/cm$^3$, alternatively from 0.930 to 0.945 g/cm$^3$, measured according to ISO 1183-1:2012 at 23° C. In some embodiments, the ethylene copolymer has a MI$_2$ value of 0.5 g/10 min. or greater, alternatively of 1 g/10 min. or greater, alternatively of 1.5 g/10 min. or greater, where MI$_2$ is the Melt Index measured according to ISO 1133-2:2011 at 190° C. with a load of 2.16 kg.

In some embodiments, component B) is from 3% to 35% by weight, alternatively from 5% to 30% by weight, alternatively from 5% to 25% by weight, of a polyolefin composition made from or containing components B$^I$), B$^{II}$), and B$^{III}$).

In some embodiments, component B$^I$) is from 5% to 35% by weight of a propylene homopolymer containing 10.0% by weight or less, alternatively from 1% to 10% by weight, of a fraction soluble in xylene at 25° C. (XS$^I$), referred to the weight of B$^I$).

In some embodiments, component B$^{II}$) is from 20% to 50% by weight of an ethylene homopolymer or a copolymer ethylene with up to 5% by weight, alternatively up 3% by weight of one or more comonomers selected from C$_3$-C$_{10}$ alpha-olefins, both homopolymer and copolymer containing 5% by weight or less, alternatively 4% by weight or less, alternatively 3% by weight or less, of a fraction soluble in xylene at 25° C. (XS$^{II}$), both the amount of comonomers and the amount of the fraction XS$^{II}$ being referred to the weight of B$^{II}$).

In some embodiments, component B$^{III}$) is from 30% to 60% by weight of a terpolymer of ethylene, propylene and butene-1 containing from 45% to 65% by weight, alternatively from 48% to 62% by weight; alternatively from 50% to 60% by weight, of ethylene units, and from 15% to 38%, alternatively from 18% to 33% by weight, alternatively from 20% to 30% by weight, of 1-butene units, and containing from 30% to 85% by weight; alternatively from 35% to 50% by weight, of a fraction soluble in xylene at 25° C. (XS$^{III}$), the amounts of ethylene units and butene-1 units and of the fraction XS$^{III}$ being referred to the weight of B$^{III}$).

In some embodiments, the lower limit of the XS$^{II}$ amount in component B$^{II}$) is 0.5% by weight, alternatively 1% by weight, in the cases.

In some embodiments and in component B$^{III}$), the amount of propylene units is equal to the complement to 100% of the sum of ethylene and butene-1 units.

In some embodiments, the present disclosure provides a filament or fiber made from or containing the polyethylene composition (I).

In some embodiments, other polyolefin components and/or components different from polyolefins are present in the filament or fiber. In some embodiments, the polyethylene composition (I) constitutes the overall polymer composition present in the filament or fiber, or part of such polymer composition, wherein the total weight of the filament or fiber is the sum of the polyethylene composition (I) and the other components.

DETAILED DESCRIPTION OF THE INVENTION

As used herein, the term "copolymer" refers to polymers containing one kind or more than one kind of comonomers.

In some embodiments, the comonomers are alpha-olefins selected from olefins having the formula $CH_2=CHR$, wherein R is an alkyl radical, linear or branched, or an aryl radical, having the appropriate number of carbon atoms; thus, from 1 to 8 carbon atoms for $C_3$-$C_{10}$ alpha-olefins.

In some embodiments, the $C_3$-$C_{10}$ alpha-olefins are selected from the group consisting of propylene, butene-1, pentene-1, 4-methylpentene-1, hexene-1, octene-1, and decene-1.

In some embodiments, alpha-olefin comonomers are present individually or in a mixture with other alpha-olefin comonomers. In some embodiments, alpha-olefin comonomers are present with ethylene in the copolymer component A). In some embodiments, the alpha-olefin comonomers are $C_5$-$C_{10}$ alpha-olefins.

In some embodiments, the comonomers in the copolymer component A) are selected from the group consisting of pentene-1, hexene-1, and octene-1. In some embodiments, the comonomer is hexene-1.

In some embodiments, the upper limit of $MI_2$ values for the copolymer component A) of the polyethylene composition (I) is 10 g/10 min., alternatively 5 g/10 min.

In some embodiments, the ranges of $MI_2$ values are:
from 0.5 to 10 g/10 min., alternatively
from 1 to 10 g/10 min., alternatively
from 1.5 to 10 g/10 min., alternatively
from 0.5 to 5 g/10 min., alternatively
from 1 to 5 g/10 min., alternatively
from 1.5 to 5 g/10 min.

In some embodiments, the density values for the copolymer component A) are from 0.925 to 0.938 g/cm$^3$, alternatively from 0.930 to 0.938 g/cm$^3$.

In some embodiments, features for the copolymer component A) are (independently from each other, or in any combination):
a Mw/Mn value of from 4 to 18, alternatively from 5 to 15, alternatively from 7 to 15, where Mw and Mn are the weight average molecular weight and the number average molecular weight respectively, measured by GPC (Gel Permeation Chromatography);
a Mw value of from 20000 g/mol to 500000 g/mol, alternatively from 50000 g/mol to 300000 g/mol, alternatively from 80000 g/mol to 250000 g/mol;
a z-average molar mass Mz of less than 1000000 g/mol, alternatively from 200000 g/mol to 800000 g/mol, wherein Mz is the z-average molar mass measured by GPC; comonomer content of 8% by weight or lower, alternatively from 8% to 3% by weight, with respect to the total weight of the copolymer;
a $MI_{21}$ value of from 55 to 120 g/10 min. alternatively from 60 to 110 g/10 min., where $MI_{21}$ is the Melt Index measured according to ISO 1133-2:2011 at 190° C. with a load of 21.6 kg;
a $MI_{21}/MI_2$ value of from 25 to 60;
a degree of long chain branching λ (lambda) of from 0 to 2 long chain branches/10000 carbon atoms, alternatively from 0.1 to 1.5 long chain branches/10000 carbon atoms;
a content of vinyl groups of at least 0.6/1000 carbon atoms, alternatively from 0.6 to 2 vinyl groups/1000 carbon atoms; or
a content of vinylidene groups of at least 0.05/1000 carbon atoms, alternatively from 0.1 to 1 vinylidene groups/1000 carbon atoms. In some embodiments, the comonomer content is derived from hexene-1.

In some embodiments, the degree of long chain branching λ (lambda) is measured by light scattering as described in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

The content of vinyl groups/1000 carbon atoms is determined by means of FT-IR in accordance with ASTM D 6248-98. As used herein, the expression "vinyl groups" refers to $-CH=CH_2$ groups; vinylidene groups and internal olefinic groups are not encompassed by this expression. It is believed that in some instances, vinyl groups are attributed to a polymer termination reaction after an ethylene insertion. It is further believed that in some instances, vinylidene end groups are formed after a polymer termination reaction after a comonomer insertion.

The determination of the content of vinylidene groups/1000 carbon atoms is carried out in accordance with ASTM D 6248-98.

In some embodiments, the molecular weight distribution of the copolymer component A) is monomodal, bimodal or multimodal. As used herein, the term "monomodal molecular weight distribution" refers to the molecular weight distribution, as determined with Gel Permeation Chromatography (GPC), having a single maximum. In some embodiments, the molecular weight distribution curve of a GPC-multimodal polymer is looked at as the superposition of the molecular weight distribution curves of two or more polymer subfractions or subtypes and shows two or more distinct maxima or is at least distinctly broadened compared with the curves for the individual fractions. In some embodiments, the molecular weight distribution of the copolymer component A) is monomodal or bimodal. In some embodiments, the molecular weight distribution of the copolymer component A) is monomodal.

In some embodiments, the amount of the copolymer component A) with a molar mass of below 1000000 g/mol, as determined by GPC in the standard determination of the molecular weight distribution, is above 95.5% by weight, alternatively above 96% by weight, alternatively above 97% by weight. In some embodiments, the amount of the copolymer component A) with a molar mass of below 1000000 g/mol is determined during the molar mass distribution measurement by applying the WIN GPC software of the company 'HS-Entwicklungsgesellschaft fur wissenschaftliche Hard-und Software mbH', Ober-Hilbersheim/Germany.

In some embodiments, the copolymer component A) of the polyolefin composition (I) is produced by using a single site catalyst system. In some embodiments, the single site catalyst system is made from or containing a hafnocene catalyst component, alternatively a hafnocene catalyst component and an iron complex having a tridentate ligand, alternatively bearing at least two aryl radicals with each bearing a halogen or tert. alkyl substituent in the ortho-position.

In some embodiments, the single site catalyst systems and the polymerization processes for preparing the copolymer component A) are as described in Patent Cooperation Treaty Publication No. WO2009103516.

In some embodiments, hafnocene catalyst components are cyclopentadienyl complexes. In some embodiments, the cyclopentadienyl complexes are bridged or unbridged bis-cyclopentadienyl complexes as described in European Patent Publication Nos. EP 129 368, EP 561 479, EP 545 304, and EP 576 970. In some embodiments, the cyclopentadienyl complexes are monocyclopentadienyl complexes. In some embodiments, the monocyclopentadienyl complexes are selected from the group consisting of bridged amidocyclopentadienyl complexes described in European Patent No. EP 416 815, multinuclear cyclopentadienyl complexes described in European Patent No. EP 632 063, pi-ligand-substituted tetrahydropentalenes described in European Patent No. EP 659 758.or pi-ligand-substituted tetrahydroindenes described in European Patent No. EP 661 300.

In some embodiments, hafnocene catalyst components are selected from the group consisting of bis(cyclopentadienyl) hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethyl-cyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclo-pentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetra-methylcyclopentadienyl)hafnium dichloride and corresponding dimethylhafnium compounds.

In some embodiments, the hafnocene catalyst component is bis(n-butylcyclopentadienyl)hafnium dichloride.

In some embodiments, iron complexes are selected from the group consisting of 2,6-Bis[1-(4,6-Dimethyl-2-chlorophenylimino) ethyl]pyridine iron(II) dichloride, 2,6-Bis[1-(2-tert.butylphenylimino)ethyl]pyridine iron(II) dichloride, 2,6-Bis[1-(2-tert.butyl-6-chlorophenylimino)ethyl]pyridine iron(II) dichloride, 2,6-Bis[1-(2-chloro-6-methyl-phenylimino)ethyl]pyridine iron(II) dichloride, 2,6-Bis[1-(2,4-dichlorophenylimino)ethyl]pyridine iron(II) dichloride, 2,6-Bis[1-(2,6-dichlorophenylimino)ethyl]pyridine iron(II) dichloride, 2,6-Bis[1-(2,4-dichlorophenylimino)methyl] pyridine iron(II) dichloride, 2,6-Bis[1-(2,4-dichloro-6-methyl-phenylimino)ethyl]pyridine iron(II) dichloride, 2,6-Bis[1-(2,4-difluorophenylimino)ethyl]pyridine iron(II) dichloride, 2,6-Bis[1-(2,4-dibromophenylimino)ethyl]pyridine iron(II) dichloride, and respective trichlorides, dibromides or tribromides.

In some embodiments, the molar ratio of the hafnocene compound to the iron complex is in the range from 1:100 to 100:1, alternatively from 1:10 to 10:1, alternatively from 1:1 to 5:1.

In some embodiments, the single site catalyst system is further made from or containing an activating compound. In some embodiments, the activating compound is an aluminoxane. In some embodiments, the aluminoxane is selected from the compounds described in Patent Cooperation Treaty Publication No. WO00/31090.

In some embodiments, the aluminoxane compound is methylaluminoxane.

In some embodiments, the hafnocene compound, the iron complex and the aluminoxane compounds are used in such amounts that the atomic ratio of aluminum from the aluminoxane compounds, including any aluminum alkyl present, to the transition metal from the hafnocene compound, is in the range from 1:1 to 2000:1, alternatively from 10:1 to 500:1, alternatively in the range from 20:1 to 400:1. In some embodiments, the atomic ratio of aluminum from the aluminoxane compounds, including any aluminum alkyl present, to the iron from the iron complex, is in the range from 1:1 to 2000:1, alternatively from 10:1 to 500:1, alternatively from 20:1 to 400:1.

In some embodiments, the catalyst systems are supported on organic or inorganic supports. In some embodiments, the supports are porous polymer particles or silica.

In some embodiments, molecular weight regulators are used. In some embodiments, molecular weight regulators are chain transfer agents. In some embodiments, the chain transfer agents are hydrogen or $ZnEt_2$.

In some embodiments, the process for producing the copolymer component A) is carried out using polymerization methods at temperatures in the range from −60 to 350° C., alternatively from 0 to 200° C., alternatively from 25 to 150° C., and under pressures of from 0.5 to 4000 bar, alternatively from 1 to 100 bar, alternatively from 3 to 40 bar. In some embodiments, the polymerization is carried out in bulk, in suspension, in the gas phase or in a supercritical medium in reactors used for the polymerization of olefins. In some embodiments, the polymerization is carried out batchwise, alternatively continuously in one or more stages. In some embodiments, the process is selected from the group consisting of solution processes, suspension processes, stirred gas-phase processes and gas-phase fluidized-bed processes.

In some embodiments, the polyolefin composition B) has MIL value from 0.5 to 25 g/10 min, alternatively from 0.5 to 20.0 g/10 min; alternatively from 1.0 to 18.0 g/10 min., where MIL is the Melt Index L, measured according to ISO 1133-2:2011 at 230° C. with a load of 2.16 kg.

In some embodiments, the intrinsic viscosity (IV.) of the fraction soluble in xylene at 25° C. of the polyolefin composition B), measured in tetrahydronaphthalene at 135° C., is from 2.4 to 3.5 dl/g, alternatively from 2.5 to 3.0 dl/g.

In some embodiments, component $B^I$) of the polyolefin composition B) has a MIL value from 50 to 200 g/10 min.; alternatively from 80 to 170 g/10 min.

In some embodiments, values of $XS^I$ in component $B^I$) are 8% by weight or less, alternatively 6% by weight or less, alternatively from 1% to 8% by weight, alternatively from 1% to 6% by weight.

In some embodiments, the MIL value of component $B^{II}$) is from 0.1 to 50 g/10 min., alternatively from 0.1 to 30 g/10 min., alternatively from 0.1 to 20 g/10 min.

In some embodiments, the MIL value of components $B^I)+B^{II})$ blended together is from 0.1 to 70 g/10 min., alternatively from 1 to 50 g/10 min, alternatively from 8 to 40 g/10 min.

In some embodiments, the alpha-olefin comonomers are present individually or in a mixture with other alpha-olefin comonomers. In some embodiments, alpha-olefin comonomers are present with ethylene in component $B^{II})$ of the polyolefin composition B). In some embodiments, the alpha-olefin comonomers are selected from the group consisting of propylene and butene-1.

In some embodiments, the alpha-olefin comonomer is butene-1.

In some embodiments, component $B^{II})$ is an ethylene homopolymer.

In some embodiments, component $B^{II})$ has a density of from 0.940 to 0.965 g/cm$^3$.

In some embodiments and in component $B^{III})$, the ratio $XS^{III}/C_2$, wherein $XS^{III}$ is the amount of fraction soluble in xylene and $C_2$ is the amount by weight of ethylene derived units referred to the weight of $B^{III})$, is 1 or lower, alternatively 0.8 or lower, alternatively 0.5 or lower, alternatively from 0.1 to 1, alternatively 0.1 to 0.8, alternatively 0.1 to 0.5.

In some embodiments, the relative amounts of components $B^I)$, $B^{II})$ and $B^{III})$, in percent by weight with respect to the total weight of $B)+B^{II})+B^{III})$ are:

from 10% to 30% of $B^I)$, from 25% to 45% of $B^{II})$ and from 35% to 55% of $B^{II})$, alternatively from 15% to 23% of $B^I)$, from 30% to 40% of $B^{II})$ and from 40% to 50% of $B^{III})$.

In some embodiments, polyolefin composition B) is prepared by a sequential polymerization, including at least three sequential steps, wherein components $B^I)$, $B^{II})$ and $B^{III})$ are prepared in separate subsequent steps, operating in each step, except the first step, in the presence of the polymer formed and the catalyst used in the preceding step. In some embodiments, the catalyst is added in the first step and not a subsequent step. In some embodiments, the catalyst is active in the first step and the subsequent steps.

In some embodiments, the polymerization is continuous or batch. In some embodiments, the polymerization is carried out in liquid phase, in the presence or not of inert diluent, or in gas phase, or by mixed liquid-gas techniques. In some embodiments, the polymerization is carried out in gas phase.

In some embodiments, the polymerization temperature is from 50 to 100° C. In some embodiments, the polymerization pressure is atmospheric or higher.

In some embodiments, molecular weight is regulated. In some embodiments, the regulation of the molecular weight is carried out by using hydrogen.

In some embodiments, the polymerizations are carried out in the presence of a Ziegler-Natta catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on MgCl$_2$.

In some embodiments, the catalysts are made from or containing the product of the reaction of the organometallic compound of group 1, 2 or 13 of the Periodic Table of elements, with a solid catalyst component made from or containing a Ti compound and an electron donor compound supported on MgCl$_2$.

In some embodiments, the organometallic compounds are aluminum alkyl compounds.

In some embodiments, the polyolefin composition B) is obtainable by using a Ziegler-Natta polymerization catalyst, alternatively a Ziegler-Natta catalyst supported on MgCl$_2$, alternatively a Ziegler-Natta catalyst made from or containing the product of reaction of 1) a solid catalyst component made from or containing a Ti compound and an electron donor (internal electron-donor) supported on MgCl$_2$;
2) an aluminum alkyl compound (cocatalyst); and, optionally,
3) an electron-donor compound (external electron-donor).

In some embodiments, the solid catalyst component 1) contains as electron-donor a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the electron-donor compounds are selected from the group consisting of phthalic acid esters and succinic acid esters. In some embodiments, the phthalic acid ester is diisobutyl phthalate.

In some embodiments, succinic acid esters are represented by the formula (I):

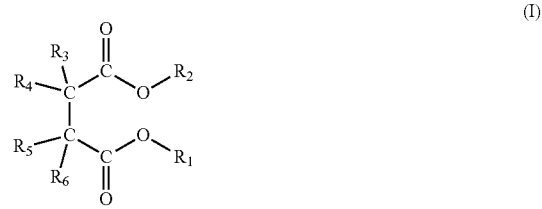

wherein the radicals $R_1$ an $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and selected from $C_1$-$C_{20}$ linear or branched alkyl, alkenyl, cycloalkyl, aryl, arylalkyl or alkylaryl group, optionally containing heteroatoms. In some embodiments, $R_3$ and $R_5$ are different from hydrogen and linked to the same carbon atom. In some embodiments, $R_4$ and $R_6$ are different from hydrogen and linked to the same carbon atom.

In some embodiments, the electron-donors are the 1,3-diethers described in European Patent Application Nos. EP-A-361 493 and 728769.

In some embodiments, cocatalysts 2) are trialkyl aluminum compounds. In some embodiments, the trialkyl aluminum compounds are selected from the group consisting of Al-triethyl, Al-triisobutyl, and Al-tri-n-butyl.

In some embodiments, the electron-donor compounds 3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the said silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si (OCH$_3$)$_2$, (phenyl)$_2$Si(OCH$_3$)$_2$, and (cyclopentyl)$_2$Si(OCH$_3$)$_2$.

In some embodiments, the 1,3-diethers are used as external donors. In some embodiments, the internal donor is a 1,3-diethers and the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

In some embodiments, the polyolefin composition B) is prepared as a physical blend of the separately-prepared components rather than as a reactor blend.

In some embodiments, the polyethylene composition (I) is obtainable by melting and mixing the components, and the mixing is effected in a mixing apparatus at temperatures from 180 to 310° C., alternatively from 190 to 280° C., alternatively from 200 to 250° C.

In some embodiments, the melt-mixing apparatuses are extruders or kneaders, alternatively twin-screw extruders. In some embodiments, the components are premixed at room temperature in a mixing apparatus.

In some embodiments, the polyethylene composition (I), was further made from or containing additives. In some embodiments, the additives were selected from the group consisting of stabilizing agents (against heat, light, or U.V.), plasticizers, antiacids, antistatic, water repellant agents, and pigments.

In some embodiments, the filament or fiber is made from or containing at least 70% by weight of the polyethylene composition (I), alternatively at least 80% by weight, alternatively 90% or 95% by weight of polyethylene composition (I), with respect to the total weight of the filament or fiber, the upper limit being 100% in the cases.

In some embodiments, the artificial turf filaments are characterized by a rounded cross-section or an angular cross-section. In some embodiments, the rounded cross-section is selected from the group consisting of circular, oval, lenticular, or multilobal. In some embodiments, the angular cross-section is rectangular.

In some embodiments and as used herein, the filaments having rounded cross-section are "monofilaments". In some embodiments and as used herein, the filaments having angular cross-section are "tapes". As used herein, the term "filament" refers to the monofilaments and tapes.

In some embodiments, the tapes have a thickness from 0.03 to 1 mm and width from 2 to 20 mm.

In some embodiments, the filaments have a titer of at least 20 den.

In some embodiments, the titer values for the filaments are at least 50 den, alternatively at least 100 or 200, alternatively at least 500 den. In some embodiments, the upper limit is 3000 den for monofilaments and 25000 den for tapes.

In some embodiments, the filament is stretched by drawing. In some embodiments, the draw ratios are from 1.5 to 10 (1:1.5 to 1:10), alternatively from 3 to 10 (1:3 to 1:10). In some embodiments, the draw ratios apply to the fibers.

In some embodiments, the filaments are made from or containing components made of materials different from polyolefins. In some embodiments, the different materials are embedded reinforcing fibers. In some embodiments, the embedded reinforcing fibers are made from or containing polyamide.

In some embodiments, the filaments are used in the form of bundles for preparation of artificial turf structures. In some embodiments, the number of individual filaments in a single bundle is up to 20. In some embodiments, filaments made of different polymer materials. In some embodiments, the different polymer materials are polypropylene or polyamide.

In some embodiments, the bundles are held together by one or more wrapping filaments. In some embodiments, the wrapping filaments are made from or containing polymer materials. In some embodiments, the polymer materials are polypropylene or polyethylene. In some embodiments, the wrapping filaments are bonded to one another and/or with the presently-disclosed bundled filaments.

In some embodiments, bundles of filaments are obtained by fibrillation of tapes.

In some embodiments, the process for preparing polyolefin filaments includes the steps of:
(a) melting the polyethylene composition (I) and, when present, the other polymer components;
(b) spinning the filaments or extruding a precursor film or tape;
(c) optionally drawing the filaments or the precursor film or tape and/or cutting the precursor film or tape and optionally drawing the filaments, when no drawing is previously carried out; and
(d) optionally finishing the filaments obtained from step (b) or (c).

In some embodiments, the melting step (a) and the spinning or extrusion step (b) are carried out continuously in sequence by using mono- or twin-screw extruders, equipped with a spinning or extrusion head. In some embodiments, the melt-mixing step is carried out in the same spinning or extrusion apparatus.

In some embodiments, the spinning heads have a plurality of holes with the same shape as the transversal section of the filament (monofilament or tape).

In some embodiments, the film extrusion heads are flat or annular dies used for the film preparation.

In some embodiments, a precursor film or tape is obtained in step (b) and then processed in step (c) by cutting the precursor film or tape into tapes of a certain size. In some embodiments, the drawing treatment is carried out on the precursor film or tape and not on the final filament.

In some embodiments, the finishing treatments are selected from the group consisting of fibrillation and crimping.

In some embodiments, fibrillation is carried out on tapes.

In some embodiments, the melting step (a) and the spinning or extrusion step (b) are carried out at the same temperatures as the melt-mixing step. In some embodiments, the temperatures are from 180 to 310° C., alternatively from 190 to 280° C., alternatively from 200 to 250° C.

In some embodiments, the spinning conditions are:
temperature in the extruder head from 200 to 300° C.;
take-up speed for primary web (unstretched) from 1 to 50 m/min.

In some embodiments, the film extrusion conditions are:
temperature in the extruder head from 200 to 300° C.;
output value from 20 to 1000 kg/hour (on industrial plants).

In some embodiments, the filament or the precursor film obtained in step (b) are cooled. In some embodiments, cooling is achieved with one or more chill rolls. In some embodiments, cooling is achieved by immersion in water at a temperature from 5 to 25° C.

To carry out the drawing treatment, the filament (monofilament or tape) or the precursor tape are previously heated at a temperature from 40 to 120-140° C. In some embodiments, heating is achieved by using a hot air oven, a boiling water bath, or heated rolls or by irradiation.

In some embodiments, drawing is achieved by delivering the filament or the precursor tape through a series of rolls having different rotation speeds.

In some embodiments, fibrillation is achieved by feeding the tape between rolls. In some embodiments, the rolls cut longitudinally and/or diagonally.

In some embodiments, fibers with lower denier than filaments are prepared by extruding the polymer melt through the spinning heads, wherein the holes have a smaller diameter with respect to the diameter used for filaments. In some embodiments, the denier of the fibers is under 20 den, alternatively from 1 to 15 den. In some embodiments, the fibers emerging from the spinning head are subsequently subjected to quenching and oriented by stretching.

In some embodiments, the artificial turf is obtained by fixing the filaments or the bundles of filaments to a substrate. As used herein, the term "backing" refers to the substrate.

In some embodiments, the backing is a polyolefin fiber mat. In some embodiments, the polyolefin is polypropylene.

In some embodiments, filling materials are deposited over the backing. In some embodiments, the filling materials are selected from the group consisting of sand and rubber particles.

EXAMPLES

The following analytical methods are used to characterize the polymer compositions.

Density

Determined according to ISO 1183-1:2012 at 23° C.

Melt Index $MI_2$, $MI_{21}$ and MIL

Determined according to ISO 1133-2:2011 with the specified temperature and load.

Intrinsic Viscosity I.V.

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine I.V.

Molecular Weight Distribution Determination

The determination of the molar mass distributions and the means Mn, Mw, Mz and Mw/Mn derived therefrom was carried out by high-temperature gel permeation chromatography using a method described in ISO 16014-1, -2, -4, issues of 2003. The specifics according to the mentioned ISO standards were as follows: Solvent 1,2,4-trichlorobenzene (TCB), temperature of apparatus and solutions 135° C. and, as concentration detector, a PolymerChar (Valencia, Paterna 46980, Spain) IR-4 infrared detector, for use with TCB. A WATERS Alliance 2000 equipped with pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used.

The solvent was vacuum distilled under Nitrogen and stabilized with 0.025% by weight of 2,6-di-tert-butyl-4-methylphenol. The flowrate used was 1 ml/min. The injection was 500 µl. The polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with Hexadecane.

The calibration curve was then adapted to Polyethylene (PE) by the Universal Calibration method (Benoit H., Rempp P. and Grubisic Z., & in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation were carried out using NTGPC_Control_V6.02.03 and NTGPC_V6.4.24 (hs GmbH, Hauptstraße 36, D-55437 Ober-Hilbersheim, Germany) respectively.

Comonomer Content

The comonomer content was determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result was compared to the estimated comonomer content derived from the mass-balance of the polymerization process and found to agree.

Tenacity and Elongation at Break of Filaments

Each filament was fixed to the clamps of an Instron dinamometer (model 1122) and tensioned to break with a traction speed of 20 mm/min for elongations lower than 100% and 50 mm/min for elongations greater than 100%, the initial distance between the clamps being of 20 mm. The ultimate strength (load at break) and the elongation at break were determined.

The tenacity was derived using the following equation:

Tenacity=Ultimate strength (cN)×10/Titer (den).

Elastic Recovery of Filaments:

Elastic recovery was measured with a dynamometer at 23° C.

Two deformations cycles were applied to the samples under the following conditions:

First Cycle

Initial Cross head distance 200 mm, cross head speed 3.3 mm/s, maximum cross head distance at maximum deformation 400 mm relaxation time at maximum cross head distance 60 seconds reverse cross head speed 3.3 mm/second cross head time at the end of the deformation cycle (cross head distance 200 mm) 180 seconds.

Second Cycle—Carried Out Three Minutes after the End of the First Cycle

Initial Cross head distance 200 mm, cross head speed 3.3 mm/s.

Third to Fifth Cycles

Carried out under the same conditions as for the second cycle, with three minutes intervals after the second and subsequent ones.

Percent of residual deformation was the percentage value of the deformation recorded when the load cell started to record a tensional force in the second cycle corresponding to the formula Percent of residual deformation=100×(current crosshead distance−initial crosshead distance)/(initial crosshead distance).

end of test

Elastic recovery (%) was the percentage value of the maximum deformation (400 mm, corresponding to 100% deformation with respect to the initial cross head distance of 200 mm) minus the percent of residual deformation.

Xylene-Soluble Faction at 25° C. (XS)

The Xylene Soluble fraction was measured according to ISO 16152, 2005, but with the following deviations (the parentheses provides that which was prescribed by the ISO 16152)

The solution volume is 250 ml (200 ml);

During the precipitation stage at 25° C. for 30 min, the solution, for the final 10 minutes, was kept under agitation by a magnetic stirrer (30 min, without any stirring at all);

The final drying step was done under vacuum at 70° C. (100° C.);

The content of the xylene-soluble fraction was expressed as a percentage of the original 2.5 grams and then, by difference (complementary to 100), the xylene insoluble %;

XS of components $B^{II}$) and $B^{III}$) were calculated by using the formula;

$$XS_{tot}=W_B^I XS^I + W_B^{II} XS^{II} + W_B^{III} XS^{III}$$

wherein $W_B^I$, $W_B^{II}$ and $W_B^{III}$ were the relative amount of components $B^I$), $B^{II}$) and $B^{III}$) ($B^I+B^{II}+B^{III}=1$)

Examples 1 and 2

The following materials were used to prepare the polyethylene composition (I).

Copolymer Component A)

Ethylene copolymer was prepared as described in Example 4 of Patent Cooperation Treaty Publication No. WO2009103516, having the properties reported in Table I below.

TABLE I

| | |
|---|---|
| Density [g/cm³] | 0.936 |
| Mw [g/mol] | 96000 |
| Mw/Mn | 9 |
| Mz [g/mol] | 281000 |
| GPC % at molar mass 1Mio | — |
| $C_6$— content [% by weight] | 5.5 |
| $MI_2$ [g/10 min.] | 2.5 |
| $MI_{21}$ [g/10 min.] | 85 |

Note:
$C_6$— = hexene-1

Polyolefin Composition B)

Polyolefin composition was prepared by sequential polymerization.

Solid Catalyst Component

The solid catalyst component used in polymerization was a Ziegler-Natta catalyst component supported on magnesium chloride, containing titanium and diisobutylphthalate as internal donor. An initial amount of microspheroidal $MgCl_2$. $2.8C_2H_5OH$ was prepared according to the method described in Example 2 of U.S. Pat. No. 4,399,054 but operating at 3,000 rpm instead of 10,000. The resulting adduct was then subjected to thermal dealcoholation at increasing temperatures from 30 to 130° C. in a nitrogen current until the molar alcohol content per mol of Mg was 1.16. Into a 1000 mL four-necked round flask, purged with nitrogen, 500 mL of $TiCl_4$ were introduced at 0° C. While stirring, 30 grams of the microspheroidal $MgCl_2.1.16C_2H_5OH$ adduct were added. The temperature was raised to 120° C. and maintained for 60 minutes. During the temperature increase, an amount of diisobutylphthalate was added to produce a Mg/ diisobutylphthalate molar ratio of 18. After the 60 minutes, the stirring was stopped, the liquid was siphoned off, and the treatment with $TiCl_4$ was repeated at 100° C. for 1 hour in the presence of an amount of diisobutylphthalate to produce a Mg/diisobutylphthalate molar ratio of 27. The stirring was stopped. The liquid was siphoned off, and the treatment with $TiCl_4$ was repeated at 100° C. for 30 min. After sedimentation and siphoning at 85° C., the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was equal to 4.

The catalyst system was then subjected to prepolymerization by suspending the catalyst system in liquid propylene at 50° C. for about 75 minutes before introducing the catalyst system into the first polymerization reactor.

Polymerization

The polymerization was carried out continuously in a series of three gas-phase reactors equipped with devices to transfer the product from the first reactor to the subsequent reactors. Into the first gas phase polymerization reactor, a propylene homopolymer, corresponding to component $B^I$), was produced by feeding, in a continuous and constant flow, the prepolymerized catalyst system, hydrogen (used as molecular weight regulator), and propylene, with the components in a gas state. The propylene-based polymer coming from the first reactor was discharged in a continuous flow and, after having been purged of unreacted monomers, introduced, in a continuous flow, into the second gas phase reactor, together with quantitatively constant flows of hydrogen and ethylene, with the components in a gas state. In the second reactor, a homopolymer of ethylene, corresponding to component $B^{II}$), was produced. The product coming from the second reactor was discharged in a continuous flow and, after having been purged of unreacted monomers, introduced, in a continuous flow, into the third gas phase reactor, together with quantitatively constant flows of hydrogen, ethylene propylene, and butene, with the component in a gas state. In the third reactor, an ethylene-propylene-butene terpolymer, corresponding to component $B^{III}$), was produced. Polymerization conditions, molar ratio of the reactants and composition and properties of the copolymers obtained are shown in Table II. The polymer particles exiting the third reactor were subjected to a steam treatment to remove the reactive monomers and volatile substances, and then dried. Thereafter the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

0.10% by weight of Irganox® 1010;
0.10% by weight of Irgafos® 168; and
0.04% by weight of DHT-4A (hydrotalcite);

where the percent amounts refer to the total weight of the polymer and stabilizing additive composition.

The Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos® 168 was tris(2,4-di-tert.-butylphenyl)phosphite. The characteristics relating to the polymer composition, are reported in Table II.

TABLE II

| Example | | 1 |
|---|---|---|
| 1st Reactor—component $B^I$) | | |
| Temperature | ° C. | 60 |
| Pressure | barg | 16 |
| $H_2/C_3$— | mol. | 0.16 |
| Split | wt % | 20 |
| Xylene soluble of $B^I$) ($XS^I$) | wt % | 4.6 |
| MIL of $B^I$) | g/10 min | 110 |
| 2nd Reactor—component $B^{II}$) | | |
| Temperature | ° C. | 80 |
| Pressure | barg | 18 |
| $H_2/C_2$— | mol. | 1.04 |
| $C_2$—/($C_2$— + $C_3$—) | mol. | 0.96 |
| Split | wt % | 35 |
| $C_2$ content of $B^{II}$)* | wt % | 100 |
| Xylene soluble of $B^{II}$) ($XS^{II}$)* | wt % | 1.7 |
| MIL of $B^{II}$)* | g/10 min | 17.4 |
| 3rd Reactor—component $B^{III}$) | | |
| Temperature | ° C. | 67 |
| Pressure | barg | 16 |
| $H_2/C_2$— | mol. | 0.16 |
| $C_3$—/($C_2$— + $C_3$—) | mol. | 0.42 |
| $C_4$—/($C_2$— + $C_4$—) | | 0.41 |
| Split | wt % | 45 |
| $C_2$ content* | wt % | 55 |
| $C_3$ content* | wt % | 22 |
| $C_4$ content* | wt % | 23 |
| Xylene soluble of $B^{III}$) ($XS^{III}$) | wt % | 39.5 |
| Total Composition—Component B) | | |
| MIL | g/10 min | 0.9 |
| I.V. of soluble in Xylene at 25° C. | dl/g | 2.75 |

Note;
$C_2$— = ethylene;
$C_3$— = propylene;
$C_4$— = 1-butene (IR);
split = amount of polymer produced in the concerned reactor.
*Calculated values Component A) and the polyolefin composition B) were blended together using the same extrusion apparatus and conditions for the polyolefin composition B), thereby obtaining the polyethylene composition (1).

The resulting polyethylene composition (1) was spun into filaments with lenticular cross-section.

The apparatus used was an extruder Leonard, 25 mm diameter, 27 L/D long+Gear pump. The die had 8 holes, lenticular shaped, approx. 8.0 mm×1.2 mm.

The main process conditions were:
Temperature profile: Cylinder 180-185-190-195° C.;
Pump 200° C.
Adapter 205° C.
Head-die 210° C.
Melt temperature: 212+/−3° C.;
Output used: around 4 kg/h;
Cooling water bath: 21+/−1° C.;
Stretching oven set: 106+/−2° C. (hot air);
Stretching ratio used: 1:4;
Annealing oven set: 106+/−2° C. (hot air);
Annealing factor: average −5.0% (slower).

Comparison Examples 1-3

Carried out as in Example 1, except that in Comparison Example 1, component A) was subjected to spinning and testing, in the absence of component B), while, in Comparison Example 2, component B) was replaced with a polyolefin composition C) made from or containing:

31% by weight of a crystalline propylene/ethylene copolymer, having an ethylene content of 3.3% by weight and solubility in xylene at room temperature of 5.5% by weight, and 69% by weight of a propylene/ethylene elastomeric copolymer, having an ethylene content of 27% by weight, solubility in xylene at room temperature of 90.3% by weight.

The polyolefin composition was obtained as a reactor grade, in subsequent stages carried out in gas phase, using a Ziegler-Natta catalyst and had an I.V. of the fraction soluble in xylene at 25° C. of 3.20 dl/g.

The properties of the resulting filaments are reported in Table III.

TABLE III

| Example No. | 1 | 2 | Com. 1 | Comp. 2 | Comp. 3 |
|---|---|---|---|---|---|
| Amount of A) [% by weight] | 90 | 80 | 100 | 90 | 80 |
| Amount of B) [% by weight] | 10 | 20 | 0 | 0 | 0 |
| Amount of C) [% by weight] | 0 | 0 | 0 | 10 | 20 |
| Titer [den.] | 2045 | 2035 | 2030 | 2060 | 1925 |
| Tenacity [g/den] | 1.42 | 1.40 | 1.47 | 1.45 | 2.56 |
| Elongation at Break [%] | 140 | 125 | 155 | 145 | 105 |
| Elastic Recovery [%] | 77.2 | 66.8 | 61.2 | 61.9 | 45 |

What is claimed is:

1. A polyethylene composition comprising:
A) from 65% to 97% by weight of a copolymer of ethylene with one or more comonomers selected from $C_3$-$C_{10}$ alpha-olefins, wherein the ethylene copolymer has:
1) a density of 0.925 g/cm$^3$ or higher, measured according to ISO 1183-1:2012 at 23° C.; and
2) a $MI_2$ value of 0.5 g/10 min. or greater, where $MI_2$ is the Melt Index measured according to ISO 1133-2:2011 at 190° C. with a load of 2.16 kg; and
B) from 3% to 35% by weight of a polyolefin composition comprising:
$B^I$) from 5% to 35% by weight of a propylene homopolymer containing 10.0% by weight or less of a fraction soluble in xylene at 25° C. ($XS^I$), referred to the weight of $B^I$);
$B^{II}$) from 20% to 50% by weight of an ethylene homopolymer or a copolymer of ethylene with up to 5% by weight of one or more comonomers selected from $C_3$-$C_{10}$ alpha-olefins, both homopolymer and copolymer containing 5% by weight or less of a fraction soluble in xylene at 25° C. ($XS^{II}$), both the amount of comonomers and the -amount of the fraction $XS^{II}$ being referred to the weight of $B^{II}$); and
$B^{III}$) from 30% to 60% by weight of a terpolymer of ethylene, propylene, and butene-1 containing from 45% to 65% by weight of ethylene units, and from 15% to 38% by weight of 1-butene units, and containing from 30% to 85% by weight of a fraction soluble in xylene at 25° C. ($XS^{III}$), the amounts of ethylene units and butene-1 units and of the fraction $XS^{III}$ being referred to the weight of $B^{III}$);
the amounts of A) and B) being referred to the total weight of A)+B) and the amounts of $B^I$), $B^{II}$) and $B^{III}$) being referred to the total weight of $B^I$)+$B^{II}$) $B^{III}$).

2. The polyolefin composition of claim 1, wherein component A) is a copolymer of ethylene with hexene-1.

3. The polyolefin composition of claim 1, wherein component A) has $MI_2$ value of from 0.5 to 5 g/10 min.

4. The polyolefin composition of claim 1, wherein component A) has a $MI_{21}/MI_2$ value of from 25 to 60.

5. The polyolefin composition of claim 1, wherein component A) has a –Mw/Mn value from 4 to 18, where Mw and Mn are the weight average molecular weight and the number average molecular weight respectively, measured by GPC.

6. The polyolefin composition of claim 1, wherein component A) has a z-average molar mass Mz of less than 1000000 g/mol, measured by GPC.

7. The polyolefin composition of claim 1, wherein the intrinsic viscosity (I.V.) of the fraction soluble in xylene at 25° C. of the polyolefin composition B), measured in tetrahydronaphthalene at 135° C., is from 2.4 to 3.5 dl/g.

8. The polyolefin composition of claim 1, wherein component $B^I$) has a MIL value of from 50 to 200 g/10 min.

9. The polyolefin composition of claim 1, wherein component $B^{II}$) is an ethylene homopolymer.

10. The polyolefin composition of claim 1, wherein, in component $B^{III}$), the ratio $XS^{III}/C_2$, wherein $XS^{III}$ is the amount of fraction soluble in xylene and $C_2$ is the amount by weight of ethylene units referred to the weight of $B^{III}$), is or lower.

11. An article of manufacture comprising the polyethylene composition of claim 1, wherein the article of manufacture is selected from the group consisting of filaments and fibers.

12. The article of manufacture of claim 11, wherein the filament or fiber is stretched by drawing with a draw ratio from 1.5 to 10.

13. The article of manufacture of claim 11, wherein the article of manufacture is a filament having a titer of at least 20 den.

14. The article of manufacture of claim 11, wherein the article of manufacture is a filament.

15. An artificial turf comprising the article of manufacture of claim 11, wherein the article of manufacture is a filament.

* * * * *